(12) United States Patent
Peng et al.

(10) Patent No.: US 10,609,125 B2
(45) Date of Patent: Mar. 31, 2020

(54) METHOD AND SYSTEM FOR TRANSMITTING COMMUNICATION DATA

(71) Applicant: BEIJING BAIDU NETCOM SCIENCE AND TECHNOLOGY CO., LTD., Beijing (CN)

(72) Inventors: Zhenyi Peng, Beijing (CN); Yanfei Wang, Beijing (CN); Jiaoren Wu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 13 days.

(21) Appl. No.: 15/534,390

(22) PCT Filed: Dec. 3, 2015

(86) PCT No.: PCT/CN2015/096234
§ 371 (c)(1),
(2) Date: Jun. 8, 2017

(87) PCT Pub. No.: WO2017/028399
PCT Pub. Date: Feb. 23, 2017

(65) Prior Publication Data
US 2018/0262560 A1    Sep. 13, 2018

(30) Foreign Application Priority Data
Aug. 18, 2015   (CN) .......................... 2015 1 0508251

(51) Int. Cl.
*H04L 29/06*      (2006.01)
*G06F 15/16*      (2006.01)
(Continued)

(52) U.S. Cl.
CPC .... *H04L 67/1002* (2013.01); *G06F 15/17331* (2013.01); *H04L 67/1097* (2013.01);
(Continued)

(58) Field of Classification Search
None
See application file for complete search history.

(56) References Cited

U.S. PATENT DOCUMENTS 8,489,761 B2 * 7/2013 Pope ....................... H04L 69/16
                                                        709/236
2008/0072236 A1 * 3/2008 Pope ..................... G06F 9/4843
                                                        718/108
(Continued)

FOREIGN PATENT DOCUMENTS

CN        102279804 A      12/2011
CN        102882697 A       1/2013
(Continued)

OTHER PUBLICATIONS

International Search Report w/English translation, dated Apr. 28, 2016, for PCT/CN2015/096234, 5 pages.

*Primary Examiner* — Natisha D Cox
(74) *Attorney, Agent, or Firm* — Seed IP Law Group LLP

(57) ABSTRACT

The present application discloses a method and system for transmitting communication data. A specific implementation of the method comprises: receiving a connection request for transmitting communication data through a remote direct memory access network; determining a transmission type of the communication data according to the connection request; establishing a socket according to the transmission type; transmitting the communication data on the remote direct memory access network by using the socket; and deleting the socket when the transmission of the communication data is completed. This implementation improves the efficiency of transmitting communication data on a remote direct memory access (RDMA) network by a non-RDMA network.

21 Claims, 4 Drawing Sheets

(51) Int. Cl.
*H04L 29/08* (2006.01)
*G06F 15/173* (2006.01)

(52) U.S. Cl.
CPC .......... *H04L 67/141* (2013.01); *H04L 69/162* (2013.01); *H04L 69/163* (2013.01); *H04L 67/14* (2013.01)

(56) References Cited

U.S. PATENT DOCUMENTS

| | | | |
|---|---|---|---|
| 2013/0019025 A1* | 1/2013 | Chaturvedi | H04L 29/06517 709/231 |
| 2013/0111059 A1* | 5/2013 | Pope | H04L 69/161 709/231 |
| 2014/0241322 A1* | 8/2014 | Kim | H04W 36/0016 370/331 |
| 2014/0358869 A1* | 12/2014 | Kim | G06F 9/5066 707/692 |
| 2016/0026605 A1* | 1/2016 | Pandit | G06F 15/17 709/212 |
| 2017/0012844 A1* | 1/2017 | Ellison | H04L 69/162 |
| 2018/0102978 A1* | 4/2018 | Shen | H04Q 11/0066 |

FOREIGN PATENT DOCUMENTS

| | | |
|---|---|---|
| CN | 103164256 A | 6/2013 |
| CN | 103166996 A | 6/2013 |
| WO | 2015/067118 A1 | 5/2015 |

\* cited by examiner

METHOD AND SYSTEM FOR TRANSMITTING COMMUNICATION DATA

CROSS-REFERENCE TO RELATED APPLICATION

This application is related to and claims priority from Chinese Application Ser. No. 201510508251.5, filed on Aug. 18, 2015, the entire disclosure of which is hereby incorporated by reference.

TECHNICAL FIELD

The present application relates to the field of communication technology, specifically to the field of Remote Direct Memory Access (RDMA) network technology, and more specifically to a method and system for transmitting communication data.

BACKGROUND

The RDMA network has no impact on the operating systems, does not need to use too many computer processing functions, and eliminates the need to perform external memory copying and context switch operations. Therefore, the RDMA network well solves the problems of communication latency, and bandwidth between the servers, and has been widely applied to high performance cluster computing in data centers.

As an efficient and portable communication specification, a Message Passing Interface (MPI) library is used for passing data between processes in cluster computing. Different vendors have their own methods for implementing an MPI library. An Accelio communication library is a reliable high-performance asynchronous message-passing and remote process-calling protocol library that can optimize hardware acceleration. In an existing cluster computing environment, if an RDMA network is adopted to improve the communication efficiency, generally an MPI library or an Accelio communication library is used.

A distributed computing program coded using an MPI library uses a process ID to identify one computing process. The program implements data exchanges by using a point-to-point communication interface and a cluster communication interface that are provided by the MPI library. The MPI library is mature and has been widely used. However, for a distributed computing program that uses Transmission Control Protocol (TCP) Socket for communication, interface adaptation needs to be implemented by means of complex adjustments on the program architecture and program modifications for communication modules, before it can be switched to an MPI communication library environment. The MPI communication library is currently widely applied to cluster computing environments of data centers, and there are mature methods for using it. However, for TCP Socket-based distributed computing programs, the program architecture needs to be adjusted and the communication level needs to be redesigned, in order to adapt to the MPI interface.

The Accelio communication library is an asynchronous communication interface based on InfiniBand verbs (ib verbs) interfaces. It implements reliable high-performance transmission by using the features of the RDMA network, and provides a Request/Reply and Send/Receive communication model. The Accelio communication library is a set of asynchronous communication interfaces supporting RDMA network transmission, and can provide reliable high-performance point-to-point communication between servers. However, the interfaces provided by Accelio are complex, and a programmer needs to take a long time to learn the Accelio Application Programming interface (API). In addition, compared with TCP Socket, Accelio provides a message transmission model, rather than byte stream transmission. Moreover, Accelio provides an asynchronous non-blocking transmission mechanism, rather than a synchronous blocking mechanism in TCP Socket. Therefore, communication-level code adjustment needs to be performed for TCP Socket-based distributed computing programs, which takes a long time.

SUMMARY

The present application provides a method and system for transmitting communication data, to solve the problem of communication data transmission on an RDMA network by an application or device of a non-RDMA network.

According to a first aspect, the present application provides a method for transmitting communication data. The method comprises:

receiving a connection request for transmitting communication data through a remote direct memory access network;

determining a transmission type of the communication data according to the connection request;

establishing a socket according to the transmission type;

transmitting the communication data on the remote direct memory access network by using the socket; and deleting the socket when the transmission of the communication data is completed.

According to a second aspect, the present application provides a system for transmitting communication data. The system comprises:

a connection request receiving unit, configured to receive a connection request for transmitting communication data through a remote direct memory access network;

a transmission type determining unit, configured to determine a transmission type of the communication data according to the connection request;

a socket establishment unit, configured to establish a socket according to the transmission type;

a data transmission execution unit, configured to transmit the communication data on the remote direct memory access network by using the socket; and a connection deletion unit, configured to delete the socket after the transmission of the communication data is completed.

According to the method for transmitting communication data and system provided in the present application, a corresponding socket is established according to a connection request; then the communication data is transmitted on an RDMA network by using the socket, thus improving the communication data transmission efficiency of non-RDMA networks; finally, the socket is deleted after the transmission of the communication data is completed, thus conserving the data processing capability of the RDMA network.

BRIEF DESCRIPTION OF THE DRAWINGS

After reading detailed descriptions of non-limiting embodiments with reference to the following accompanying drawings, other features, objectives and advantages of the present invention will be more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Embodiment 1

Figure 1:
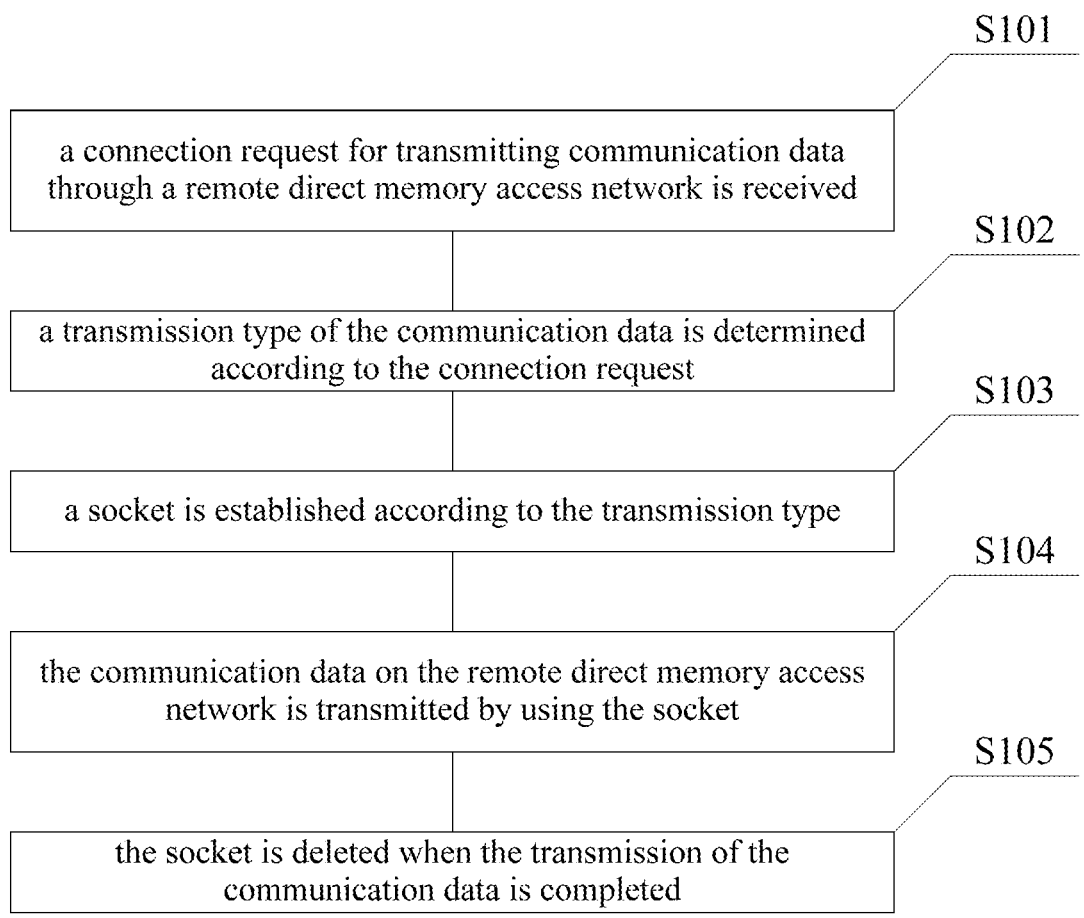
FIG. 1 is a flow chart of a method for transmitting communication data according to an embodiment of the present application.

This embodiment provides a method for transmitting communication data. As shown in FIG. 1, the method of this embodiment includes the following steps.

At step S101, a connection request for transmitting communication data through a remote direct memory access network is received.

A remote direct memory access network (hereinafter briefly referred to as an RDMA network) is an efficient cluster network. If an application on a distributed network or other network needs to transmit communication data through an RDMA network, the application first needs to initiate a connection request to the RDMA network.

At step S102, a transmission type of the communication data is determined according to the connection request.

The connection request may be in various forms. Considering the transmission direction, the connection request mainly has three forms: 1, the connection request requires the distributed network to send communication data to an application on the RDMA network; 2, the connection request requires the RDMA network to send communication data to an application on the distributed network; 3, the connection request requires a communication data sending party on the distributed network to send communication data to a communication data receiving party on the distributed network through the RDMA network (including the case in which the communication data sending party and the communication data receiving party send communication data to each other). For different connection requests, different types of transmissions need to be established. Corresponding to the three types of connection requests, there are also three transmission types, to respectively satisfy the communication requirements of the connection requests.

At step S103, a socket is established according to the transmission type.

The socket is used for implementing the bidirectional exchange of communication data. Because specific connection requests are classified into different types in this embodiment, the function of the socket needs to be set according to the transmission type.

At step S104, the communication data on the remote direct memory access network is transmitted by using the socket.

After the socket is established, the sending party and the receiving party of the communication data are connected by using the socket, so as to implement the transmission of the communication data on the RDMA network.

At step S105, the socket is deleted when the transmission of the communication data is completed.

The socket consumes resources and the data processing capability of the RDMA network. When the transmission of the communication data is completed, the socket needs to be deleted, so as to conserve the data processing capability of the RDMA network.

According to the method provided in this embodiment, a corresponding socket is established according to a connection request; then the communication data is transmitted on an RDMA network by using the socket, thus improving the communication data transmission efficiency of non-RDMA networks; finally, the socket is deleted after the transmission of the communication data is completed, thus conserving the data processing capability of the RDMA network.

As can be known from the foregoing descriptions, in the present application, corresponding to the three types of connection requests, there are also three transmission types. Each of the transmission types may include two basic types: data receiving and data sending. Therefore, step S103 specifically includes:

establishing a receiving-side socket if the connection request includes an information sending request, where the receiving-side socket is used for converting the communication data sent from a communication data sending side into to-be-transmitted data, and sending the to-be-transmitted data to the remote direct memory access network, and the to-be-transmitted data satisfies a data transmission condition of the remote direct memory access network; and establishing a sending-side socket if the connection request includes an information receiving request, where the sending-side socket is used for converting the to-be-transmitted data on the remote direct memory access network into the communication data, and sending the communication data to a communication data receiving side.

In addition, if the connection request includes both an information sending request and an information receiving request, a receiving-side socket and a sending-side socket are established at the same time.

The establishing a receiving-side socket includes:

(1) creating a receive memory pool used for storing the communication data;

The receive memory pool is used for temporarily storing the communication data, to facilitate subsequent processing on the communication data. Generally, the receive memory pool has a large space, to facilitate the simultaneous processing of a large amount of communication data. The space of the receive memory pool depends on actual requirements.

(2) setting a first memory allocation instruction, where the first memory allocation instruction is used for allocating, according to a size of the communication data sent from the communication data sending side, a first memory in the receive memory pool to the communication data, and placing the communication data into the first memory.

(3) configuring a first-in-first-out data sending sequence and a send callback function, where the first-in-first-out data sending sequence is used for retrieving the communication data from the first memory, sorting the communication data for sending, and sending the to-be-transmitted data to the remote direct memory access network after the communication data is converted into the to-be-transmitted data by the send callback function. Here, the send callback function belongs to a Libevent network library. The Libevent network library is a light-weight open-source event-triggered network library compiled in C language, and has the advantages of high performance, light weight, refined source code, being cross-platform, and supporting multiple types of input/output multiplexing.

The first-in-first-out data sending sequence is used for implementing the sequential sending of the communication data. The send callback function is equivalent to a data format conversion program, which is used for converting a data format of a non-RDMA network into a data format of an RDMA network. The Libevent network library may also be used to listen to the first-in-first-out data sending sequence. In this way, pipelining of sending of underlying data is implemented by using the features that the Libevent network library is cross-platform and supports multiple types of input/output multiplexing, thereby making full use of the bandwidth.

(4) encapsulating the receive memory pool, the first memory allocation instruction, the first-in-first-out data sending sequence, and the send callback function to form the receiving-side socket.

As can be known from the foregoing descriptions, the specific function of the receiving-side socket is to: receive communication information of another network; then allocate a first memory in the receive memory pool to the communication data according to a first memory allocation instruction; after placing the communication data into the first memory, place the communication data into a first-in-first-out data sending sequence according to the order in which the communication data is processed, convert the communication data into to-be-transmitted data of the RDMA network by using a send callback function, and send the to-be-transmitted data to the remote direct memory access network.

The establishing a sending-side socket includes:

(1) creating a send memory pool used for storing the communication data;

The process of creating the send memory pool is the same as that of creating the receive memory pool, and will not be repeatedly described here.

(2) configuring a receive callback function, where the receive callback function is used for converting the to-be-transmitted data on the remote direct memory access network into the communication data;

Because the sending-side socket is directly connected to the RDMA network, the sending-side socket receives to-be-transmitted data on the RDMA network. The to-be-transmitted data is converted into communication data of another network by using the receive callback function.

(3) setting a second memory allocation instruction, where the second memory allocation instruction is used for allocating, according to a size of the communication data, a second memory in the send memory pool to the communication data, and placing the communication data into the second memory;

(4) configuring a first-in-first-out data receiving sequence, where the first-in-first-out data receiving sequence is used for retrieving the communication data from the second memory, sorting the communication data for sending, and sending the communication data to the communication data receiving side. Here, the first-in-first-out data receiving sequence is also listened to by the Libevent network library, so that pipelining of sending of underlying data is implemented, thereby making full use of the bandwidth.

(5) encapsulating the send memory pool, the receive callback function, the second memory allocation instruction, and the first-in-first-out data receiving sequence to form the sending-side socket.

As can be known from the foregoing descriptions, the specific function of the sending-side socket is to: receive to-be-transmitted data on the RDMA network; convert the to-be-transmitted data into communication data by using a receive callback function; then allocate a second memory in the send memory pool to the communication data according to a second memory allocation instruction, and place the communication data into the second memory; sort the communication data for sending by using a first-in-first-out data receiving sequence, and send the communication data to the communication data receiving side.

Corresponding to the transmission types, step S104 also has three cases, specifically including:

(1) establishing a receiving-side socket

In this case, the transmitting the communication data on the remote direct memory access network by using the socket includes:

(a) binding a first Internet Protocol (briefly referred to as IP) address and a first port of the communication data sending side to the receiving-side socket;

Because the communication data is sent to the communication data receiving side through an Internet Protocol address and a port, the first Internet Protocol address and the first port of the communication data sending side needs to be bound to the receiving-side socket first.

(b) sending the to-be-transmitted data of the receiving-side socket to a receiving end on the remote direct memory access network by using the first Internet Protocol address and the first port.

(2) establishing a sending-side socket

In this case, the transmitting the communication data on the remote direct memory access network by using the socket includes:

(a) binding a second Internet Protocol address and a second port of the communication data receiving side to the sending-side socket; and (b) sending the to-be-transmitted data of a sending end on the remote direct memory access network to the sending-side socket by using the second Internet Protocol address and the second port.

(3) establishing a receiving-side socket and a sending-side socket at the same time;

In this case, the transmitting the communication data on the remote direct memory access network by using the socket includes:

(a) binding a second Internet Protocol address and a second port of the communication data receiving side to the sending-side socket;

(b) binding the first Internet Protocol address and the first port of the communication data sending side to the receiving-side socket, where the second Internet Protocol address corresponds to the first Internet Protocol address, and the second port corresponds to the first port; and (c) finding the second Internet Protocol address and the second port according to the first Internet Protocol address and the first port, establishing a link between the receiving-side socket and the sending-side socket, and sending the communication data sent from the communication data sending side to the communication data receiving side through the link.

In practice, the receive memory pool and the send memory pool cannot be established while the receiving-side socket and the sending-side socket are being established. The creation of the receive memory pool and the send memory pool requires applying to the RDMA network for memory. That is, before step S103, the method further includes a step of registering a memory pool.

The establishment of a socket requires corresponding resources of the RDMA network. After the transmission of the communication data is completed, the existence of the socket causes a waste of resources on the RDMA network. Therefore, step S105 includes step S1051 and step S1052.

At step S1051, a connection deletion request is received.

The connection deletion request may be sent from the sending party of the communication data or from the receiving party of the communication data, to indicate that the transmission of the communication data has been completed.

At step S1052, the socket is deconstructed according to the connection deletion request.

Generally, the transmission of the communication data can be completed within a set period of time. However, in practice, the transmission of the communication data may be delayed due to network reasons. For example, the sending end initiates a connection deletion request within a set period of time after sending the communication data, but the communication data cannot reach the receiving party of the communication data in time due to network delay or network congestion caused by large data transfer. If the socket is deleted at the moment, the transmission of the communication data will fail. Therefore, before the socket is deleted, the status of the communication data needs to be checked, which is specifically: determining whether the socket is transmitting data; and if no, deconstructing the socket; otherwise, sending an alarm signal.

Embodiment 2

Figure 2:
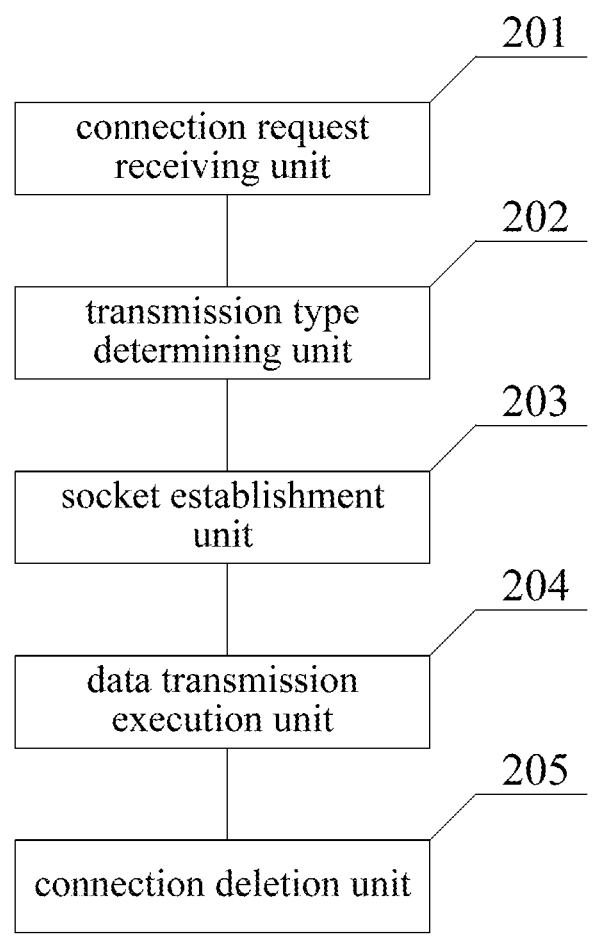
FIG. 2 is a schematic structural diagram of a system for transmitting communication data according to an embodiment of the present application.

This embodiment is based on the same inventive concept as that of Embodiment 1. This embodiment provides a system for transmitting communication data. As shown in FIG. 2, the system of this embodiment includes:

a connection request receiving unit 201, configured to receive a connection request for transmitting communication data through a remote direct memory access network;

A remote direct memory access network (hereinafter briefly referred to as an RDMA network) is an efficient cluster network. If an application on a distributed network or other network needs to transmit communication data through an RDMA network, the application first needs to initiate a connection request to the RDMA network.

a transmission type determining unit 202, configured to determine a transmission type of the communication data according to the connection request;

The connection request may be in various forms. Considering the transmission direction, the connection request mainly has three forms: 1, the connection request requires the distributed network to send communication data to an application on the RDMA network; 2, the connection request requires the RDMA network to send communication data to an application on the distributed network; 3, the connection request requires a communication data sending party on the distributed network to send communication data to a communication data receiving party on the distributed network through the RDMA network (including the case in which the communication data sending party and the communication data receiving party send communication data to each other). For different connection requests, different types of transmissions need to be established. Corresponding to the three types of connection requests, there are also three transmission types, to respectively satisfy the communication requirements of the connection requests.

a socket establishment unit 203, configured to establish a socket according to the transmission type;

The socket is used for implementing the bidirectional exchange of communication data. Because specific connection requests are classified into different types in this embodiment, the function of the socket needs to be set according to the transmission type.

a data transmission execution unit 204, configured to transmit the communication data on the remote direct memory access network by using the socket; and After the socket is established, the sending party and the receiving party of the communication data are connected by using the socket, so as to implement the transmission of the communication data on the RDMA network.

a connection deletion unit 205, configured to delete the socket after the transmission of the communication data is completed.

The socket consumes resources and the data processing capability of the RDMA network. When the transmission of the communication data is completed, the socket needs to be deleted, so as to conserve the data processing capability of the RDMA network.

Specifically, the socket establishment unit 203 includes:

a determining subunit, configured to: establish a receiving-side socket if the connection request includes an information sending request, where the receiving-side socket is used for converting the communication data sent from a communication data sending side into to-be-transmitted data, and sending the to-be-transmitted data to the remote direct memory access network, and the to-be-transmitted data satisfies a data transmission condition of the remote direct memory access network; and establish a sending-side socket if the connection request includes an information receiving request, where the sending-side socket is used for converting the to-be-transmitted data on the remote direct memory access network into the communication data, and sending the communication data to a communication data receiving side.

In addition, if the connection request includes both an information sending request and an information receiving request, a receiving-side socket and a sending-side socket are established at the same time.

The determining subunit includes: a receiving-side socket establishment module 2031 and a sending-side socket establishment module 2032.

The receiving-side socket establishment module 2031 includes:

a receive memory pool submodule, configured to create a receive memory pool used for storing the communication data;

a first memory allocation instruction submodule, configured to set a first memory allocation instruction, where the first memory allocation instruction is used for allocating, according to a size of the communication data sent from the communication data sending side, a first memory in the receive memory pool to the communication data, and placing the communication data into the first memory;

a first configuration submodule, configured to configure a first-in-first-out data sending sequence and a send callback function, where the first-in-first-out data sending sequence is used for retrieving the communication data from the first memory, sorting the communication data for sending, and sending the to-be-transmitted data to the remote direct memory access network after the communication data is converted into the to-be-transmitted data by the send callback function. Here, the send callback function belongs to a Libevent network library.

The first-in-first-out data sending sequence is used for implementing the sequential sending of the communication data. The send callback function is equivalent to a data format conversion program, which is used for a data format of a non-RDMA network into a data format of an RDMA network. The Libevent network library may also be used to listen to the first-in-first-out data sending sequence. In this way, pipelining of sending of underlying data is implemented by using the features that the Libevent network library is cross-platform and supports multiple types of input/output multiplexing, thereby making full use of the bandwidth.

a first encapsulation submodule, configured to encapsulate the receive memory pool, the first memory allocation instruction, the first-in-first-out data sending sequence, and the send callback function to form the receiving-side socket.

As can be known from the foregoing descriptions, the specific function of the receiving-side socket is to: receive communication information of another network; then allocate a first memory in the receive memory pool to the communication data according to a first memory allocation instruction; after placing the communication data into the first memory, place the communication data into a first-in-first-out data sending sequence according to the order in which the communication data is processed, convert the communication data into to-be-transmitted data of the RDMA network by using a send callback function, and send the to-be-transmitted data to the remote direct memory access network.

The sending-side socket establishment module 2032 includes:

a send memory pool submodule, configured to create a send memory pool used for storing the communication data;

a receive callback function submodule, configured to configure a receive callback function, where the receive callback function is used for converting the to-be-transmitted data on the remote direct memory access network into the communication data;

a second memory allocation instruction submodule, configured to set a second memory allocation instruction, where the second memory allocation instruction is used for allocating, according to a size of the communication data, a second memory in the send memory pool to the communication data, and placing the communication data into the second memory;

a first-in-first-out data receiving sequence submodule, configured to configure a first-in-first-out data receiving sequence, where the first-in-first-out data receiving sequence is used for retrieving the communication data from the second memory, sorting the communication data for sending, and sending the communication data to the communication data receiving side; Here, the first-in-first-out data receiving sequence is also listened to by the Libevent network library, so that pipelining of sending of underlying data is implemented, thereby making full use of the bandwidth.

a second encapsulation submodule, configured to encapsulate the send memory pool, the receive callback function, the second memory allocation instruction, and the first-in-first-out data receiving sequence to form the sending-side socket.

As can be known from the foregoing descriptions, the specific function of the sending-side socket is to: receive to-be-transmitted data on the RDMA network; convert the to-be-transmitted data into communication data by using a receive callback function; then allocate a second memory in the send memory pool to the communication data according to a second memory allocation instruction, and place the communication data into the second memory; sort the communication data for sending by using a first-in-first-out data receiving sequence, and send the communication data to the communication data receiving side.

Corresponding to the transmission types, the data transmission execution unit 204 respectively includes a first transmission subunit, a second transmission subunit, and a third transmission subunit.

The first transmission subunit corresponds to the first type of connection request, and specifically includes:

a first binding module, configured to bind a first Internet Protocol address and a first port of the communication data sending side to the receiving-side socket; and a first transmission module, configured to send the to-be-transmitted data of the receiving-side socket to a receiving end on the remote direct memory access network by using the first Internet Protocol address and the first port.

The second transmission subunit corresponds to the second type of connection request, and specifically includes:

a second binding module, configured to bind a second Internet Protocol address and a second port of the communication data receiving side to the sending-side socket; and a second transmission module, configured to send the to-be-transmitted data of a sending end on the remote direct memory access network to the sending-side socket by using the second Internet Protocol address and the second port.

The third transmission subunit corresponds to the third type of connection request, and specifically includes:

a third binding module, configured to bind a second Internet Protocol address and a second port of the communication data receiving side to the sending-side socket;

a fourth binding module, configured to bind the first Internet Protocol address and the first port of the communication data sending side to the receiving-side socket, where the second Internet Protocol address corresponds to the first Internet Protocol address, and the second port corresponds to the first port; and a third transmission module, configured to find the second Internet Protocol address and the second port according to the first Internet Protocol address and the first port, establish a link between the receiving-side socket and the sending-side socket, and send the communication data sent from the communication data sending side to the communication data receiving side through the link.

In practice, the receive memory pool and the send memory pool cannot be established while the receiving-side socket and the sending-side socket are being established. The creation of the receive memory pool and the send memory pool requires applying to the RDMA network for memory. That is, the system further includes:

a memory pool registration unit, configured to register a memory pool.

The establishment of a socket requires corresponding resources of the RDMA network. After the transmission of the communication data is completed, the existence of the socket causes a waste of resources on the RDMA network. Therefore, the connection deletion unit 205 includes:

a deletion request receiving subunit 2051, configured to receiving a connection deletion request;

The connection deletion request may be sent from the sending party of the communication data or from the receiving party of the communication data, to indicate that the transmission of the communication data has been completed.

a deconstruction subunit 2052, configured to deconstruct the socket according to the connection deletion request.

Generally, the transmission of the communication data can be completed within a set period of time. However, in practice, the transmission of the communication data may be delayed due to network reasons. For example, the sending end initiates a connection deletion request within a set period of time after sending the communication data, but the communication data cannot reach the receiving party of the communication data in time due to network delay or network congestion caused by large data transfer. If the socket is deleted at the moment, the transmission of the communication data will fail. Therefore, before the socket is deleted, the status of the communication data needs to be checked. Therefore, the deconstruction subunit 2052 further includes a deconstruction execution module, configured to: determine whether the socket is transmitting data; and if no, deconstruct the socket; otherwise, send an alarm signal.

Embodiment 3

The present application is described in detail below with reference to an actual scenario.

In this embodiment, the present application is described in detail through an example in which a socket is encapsulated on an Accelio communication library to implement the transfer of communication data on an RDMA network by using the socket.

Figure 3:
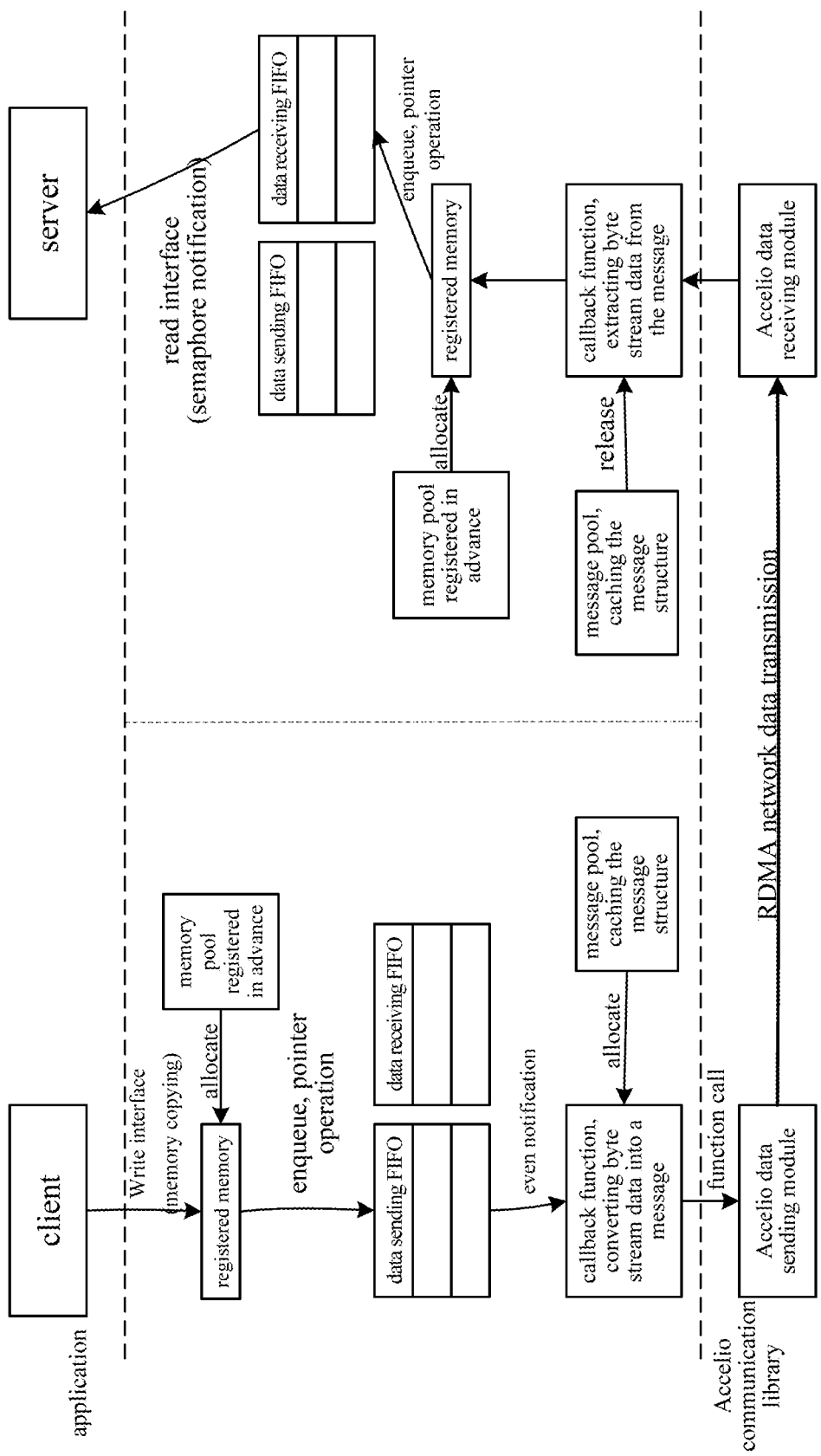
FIG. 3 is a structural diagram of an actual scenario of a method for transmitting communication data according to the present application.

The scenario of this embodiment is that a server and a client of a distributed network communicate with each other by means of an RDMA network, as shown in FIG. 3.

The method of this embodiment includes the following steps.

At step S301, the server sends a connection request to a system for transmitting communication data.

At step S302, the transmission of the communication data system establishes a socket according to the connection request.

In this embodiment, as the server and the client communicate with each other, a receiving-side socket and a sending-side socket need to be established respectively. The process of establishing the sockets is the same as those described in the foregoing Embodiment 1 and Embodiment 2, and will not be repeatedly described here.

At step S303, the server binds its Internet Protocol address and port to the socket, and notifies the client of a designated Internet Protocol address and port.

The server binds its Internet Protocol address and port to the socket to inform the client of the location of the server on the network, and notifies the client of a designated Internet Protocol address and port, so as to transfer communication data. It should be noted that, because the server may establish communication with multiple clients, the designated Internet Protocol address and port notified to the client should be included in the Internet Protocol address and port of the server.

At step S304, the socket of the client initiates a connection according to the designated Internet Protocol address and port through an RDMA network.

Figure 4:
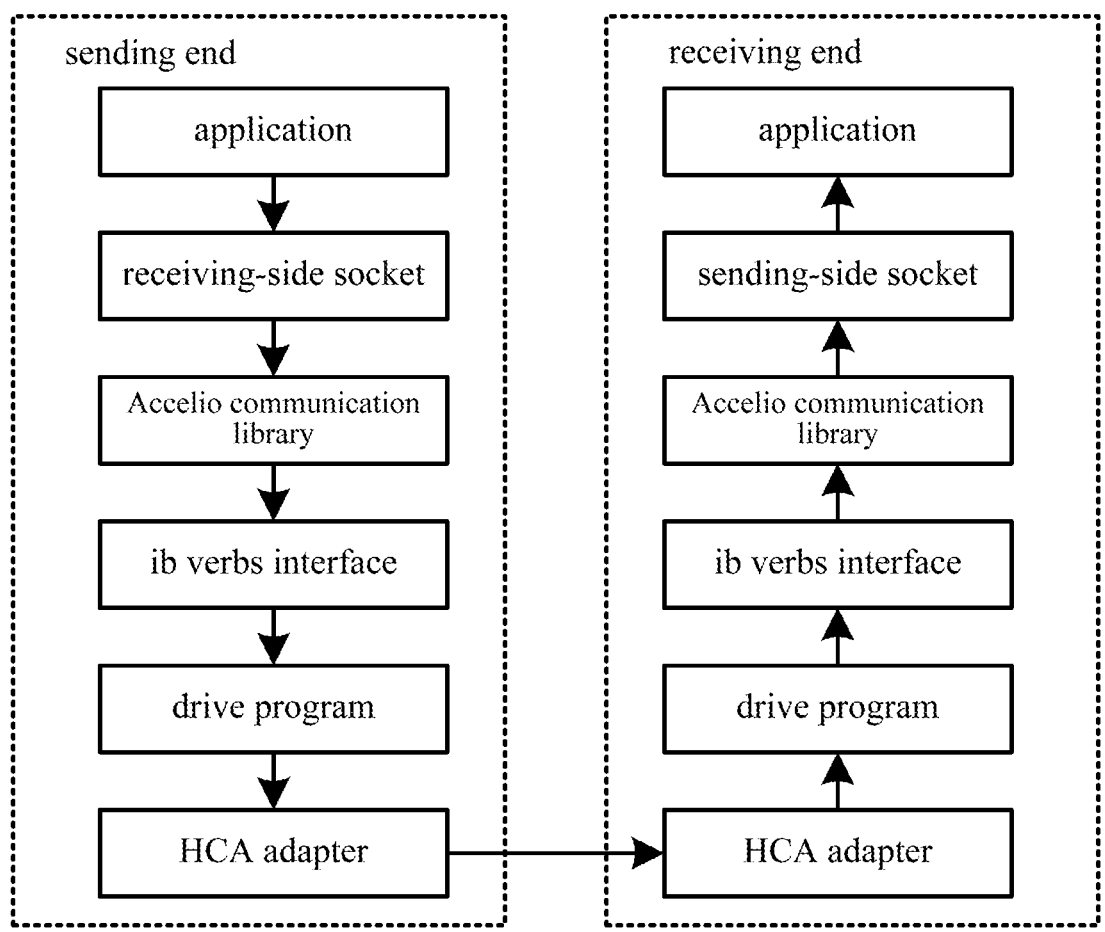
FIG. 4 is a diagram illustrating a data transmission architecture of a method for transmitting communication data according to the present application.

At step S305, the server responds to the connection, and establishes a communication path from the client to the server through the RDMA network. The client is provided with a write interface for writing data to the socket, and the server is provided with an interface for reading data from the socket, thus forming a complete communication data transmission path. A specific path for the transmission of the communication data is as follows: An application of a sending end sends communication data to a receiving-side socket; the receiving-side socket converts the communication data into to-be-transmitted data, and sends the to-be-transmitted data to an Accelio communication library on an RDMA network; then the communication data is sent to an Accelio communication library corresponding to a receiving end respectively through ib verbs interfaces, drive programs and host channel adaptor (HCA) adapters on the two sides, and finally sent to the receiving end, as shown in FIG. 4.

The above description is about the unidirectional communication from the client to the server, where the client is connected to the RDMA network through the receiving-side socket, and the server is connected to the RDMA network through the sending-side socket. If bidirectional communication between the client and the server needs to be implemented, a receiving-side socket and a sending-side socket need to be provided on each of the client and the server, where the client and the server are the sending end and the receiving end of each other.

At step S306, after the client or the server sends a connection deletion request to the transmission of the communication data system, the transmission of the communication data system first checks whether the socket is currently transmitting data, and deletes the socket if determining that the socket is not transmitting data.

The client and the server in this embodiment can quickly switch to an RDMA network by means of a socket, thereby improving the communication data transmission performance.

The units or modules involved in the embodiments of the present application may be implemented by way of software or hardware. The described units or modules may also be provided in a processor, for example, described as: a processor, comprising a connection request receiving module, a transmission type determining module, a socket establishment module, a data transmission execution module, and a connection deletion module, where the names of these units or modules are not considered as a limitation to the units or modules. For example, the connection request receiving module may also be described as "a module for receiving a connection request for transmitting communication data through a remote direct memory access network".

According to another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The programs are used by one or more processors to execute the method for transmitting communication data described in the present application.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for transmitting communication data in a distributed network, comprising:
   receiving a connection request for transmitting communication data through a remote direct memory access network;
   determining a transmission type of the communication data according to the connection request;
   establishing a socket according to the transmission type;
   transmitting the communication data on the remote direct memory access network by using the socket; and
   deleting the socket when the transmission of the communication data is completed.

2. The method according to claim 1, wherein the establishing a socket according to the transmission type comprises:
   establishing a receiving-side socket if the connection request comprises an information sending request, wherein the receiving-side socket is used for converting the communication data sent from a communication data sending side into to-be-transmitted data, and sending the to-be-transmitted data to the remote direct memory access network, and the to-be-transmitted data satisfies a data transmission condition of the remote direct memory access network; and
   establishing a sending-side socket if the connection request comprises an information receiving request, wherein the sending-side socket is used for converting the to-be-transmitted data on the remote direct memory access network into the communication data, and sending the communication data to a communication data receiving side.

3. The method according to claim 2, wherein the establishing a receiving-side socket comprises:
   creating a receive memory pool used for storing the communication data;
   setting a first memory allocation instruction, wherein the first memory allocation instruction is used for allocating, according to a size of the communication data sent from a communication data sending side, a first memory in the receive memory pool to the communication data, and placing the communication data into the first memory;
   configuring a first-in-first-out data sending sequence and a send callback function, wherein the first-in-first-out data sending sequence is used for retrieving the communication data from the first memory, sorting the communication data for sending, and sending the to-be-transmitted data to the remote direct memory access network after the communication data is converted into the to-be-transmitted data by the send callback function; and
   encapsulating the receive memory pool, the first memory allocation instruction, the first-in-first-out data sending sequence, and the send callback function to form the receiving-side socket.

4. The method according to claim 3, wherein the establishing a sending-side socket comprises:
   creating a send memory pool used for storing the communication data;
   configuring a receive callback function, wherein the receive callback function is used for converting the to-be-transmitted data on the remote direct memory access network into the communication data;
   setting a second memory allocation instruction, wherein the second memory allocation instruction is used for allocating, according to a size of the communication data, a second memory in the send memory pool to the communication data, and placing the communication data into the second memory;
   configuring a first-in-first-out data receiving sequence, wherein the first-in-first-out data receiving sequence is used for retrieving the communication data from the second memory, sorting the communication data for sending, and sending the communication data to the communication data receiving side; and
   encapsulating the send memory pool, the receive callback function, the second memory allocation instruction, and the first-in-first-out data receiving sequence to form the sending-side socket.

5. The method according to claim 4, wherein the transmitting the communication data on the remote direct memory access network by using the socket comprises:
   binding a first Internet Protocol address and a first port of the communication data sending side to the receiving-side socket; and
   sending the to-be-transmitted data of the receiving-side socket to a receiving end on the remote direct memory access network by using the first Internet Protocol address and the first port.

6. The method according to claim 5, wherein the transmitting the communication data on the remote direct memory access network by using the socket comprises:
   binding a second Internet Protocol address and a second port of the communication data receiving side to the sending-side socket; and
   sending the to-be-transmitted data of a sending end on the remote direct memory access network to the sending-side socket by using the second Internet Protocol address and the second port.

7. The method according to claim 6, wherein the transmitting the communication data on the remote direct memory access network by using the socket comprises:
   binding the second Internet Protocol address and the second port of the communication data receiving side to the sending-side socket;
   binding the first Internet Protocol address and the first port of the communication data sending side to the receiving-side socket, wherein the second Internet Protocol address corresponds to the first Internet Protocol address, and the second port corresponds to the first port; and
   finding the second Internet Protocol address and the second port according to the first Internet Protocol address and the first port, establishing a link between the receiving-side socket and the sending-side socket, and sending the communication data sent from the communication data sending side to the communication data receiving side through the link.

8. The method according to claim 1, wherein before the establishing a socket according to the transmission type, the method further comprises:
   registering a memory pool.

9. The method according to claim 1, wherein the deleting the socket when the transmission of the communication data is completed comprises:
   receiving a connection deletion request; and deconstructing the socket according to the connection deletion request.

10. The method according to claim 9, wherein the deconstructing the socket according to the connection deletion request comprises:
   determining whether the socket is transmitting data; and if not, deconstructing the socket; otherwise, sending an alarm signal.

11. A system for transmitting communication data system in a distributed network, comprising:
   at least one processor; and
   a memory storing instructions, which when executed by the at least one processor, cause the at least one processor to perform operations, the operations comprising:
   receiving a connection request for transmitting communication data through a remote direct memory access network;
   determining a transmission type of the communication data according to the connection request;
   establishing a socket according to the transmission type;
   transmitting the communication data on the remote direct memory access network by using the socket; and
   deleting the socket after the transmission of the communication data is completed.

12. The system according to claim 11, wherein the establishing a socket according to the transmission type comprises:
   establishing a receiving-side socket if the connection request comprises an information sending request, wherein the receiving-side socket is used for converting the communication data sent from a communication data sending side into to-be-transmitted data, and sending the to-be-transmitted data to the remote direct memory access network, and the to-be-transmitted data satisfies a data transmission condition of the remote direct memory access network; and
   establishing a sending-side socket if the connection request comprises an information receiving request, wherein the sending-side socket is used for converting the to-be-transmitted data on the remote direct memory access network into the communication data, and sending the communication data to a communication data receiving side.

13. The system according to claim 12, wherein the establishing a receiving-side socket comprises:
   creating a receive memory pool used for storing the communication data;
   setting a first memory allocation instruction, wherein the first memory allocation instruction is used for allocating, according to a size of the communication data sent from the communication data sending side, a first memory in the receive memory pool to the communication data, and placing the communication data into the first memory;
   configuring a first-in-first-out data sending sequence and a send callback function, wherein the first-in-first-out data sending sequence is used for retrieving the communication data from the first memory, sorting the communication data for sending, and sending the to-be-transmitted data to the remote direct memory access network after the communication data is converted into the to-be-transmitted data by the send callback function; and
   encapsulating the receive memory pool, the first memory allocation instruction, the first-in-first-out data sending sequence, and the send callback function to form the receiving-side socket.

14. The system according to claim 13, wherein the establishing a sending-side socket comprises:
   creating a send memory pool used for storing the communication data;
   configuring a receive callback function, wherein the receive callback function is used for converting the to-be-transmitted data on the remote direct memory access network into the communication data;
   setting a second memory allocation instruction, wherein the second memory allocation instruction is used for allocating, according to a size of the communication data, a second memory in the send memory pool to the communication data, and placing the communication data into the second memory;
   configuring a first-in-first-out data receiving sequence, wherein the first-in-first-out data receiving sequence is used for retrieving the communication data from the second memory, sorting the communication data for sending, and sending the communication data to the communication data receiving side; and
   encapsulating the send memory pool, the receive callback function, the second memory allocation instruction, and the first-in-first-out data receiving sequence to form the sending-side socket.

15. The system according to claim 14, wherein the transmitting the communication data on the remote direct memory access network by using the socket comprises:
   binding a first Internet Protocol address and a first port of the communication data sending side to the receiving-side socket; and
   sending the to-be-transmitted data of the receiving-side socket to a receiving end on the remote direct memory access network by using the first Internet Protocol address and the first port.

16. The system according to claim 15, wherein the transmitting the communication data on the remote direct memory access network by using the socket comprises:
   binding a second Internet Protocol address and a second port of the communication data receiving side to the sending-side socket; and
   sending the to-be-transmitted data of a sending end on the remote direct memory access network to the sending-side socket by using the second Internet Protocol address and the second port.

17. The system according to claim 16, wherein the transmitting the communication data on the remote direct memory access network by using the socket comprises:
   binding a second Internet Protocol address and a second port of the communication data receiving side to the sending-side socket;
   binding the first Internet Protocol address and the first port of the communication data sending side to the receiving-side socket, wherein the second Internet Protocol address corresponds to the first Internet Protocol address, and the second port corresponds to the first port; and
   finding the second Internet Protocol address and the second port according to the first Internet Protocol address and the first port, establishing a link between the receiving-side socket and the sending-side socket, and sending the communication data sent from the communication data sending side to the communication data receiving side through the link.

18. The system according to claim 11, the operations further comprising:

registering a memory pool.

19. The system according to claim 11, wherein the deleting the socket when the transmission of the communication data is completed comprises:

receiving a connection deletion request; and deconstructing the socket according to the connection deletion request.

20. The system according to claim 19, wherein the deconstructing the socket according to the connection deletion request comprises:

determining whether the socket is transmitting data; and
if no, deconstructing the socket; otherwise, sending an alarm signal.

21. A non-transitory computer storage medium storing computer readable instructions that can be executed by a processor, the computer readable instructions when executed by the processor, causing the processor to execute the method according to claim 1.

* * * * *